M. ATWOOD.
Harrow.
No. 84,339.  Patented Nov. 24, 1868.
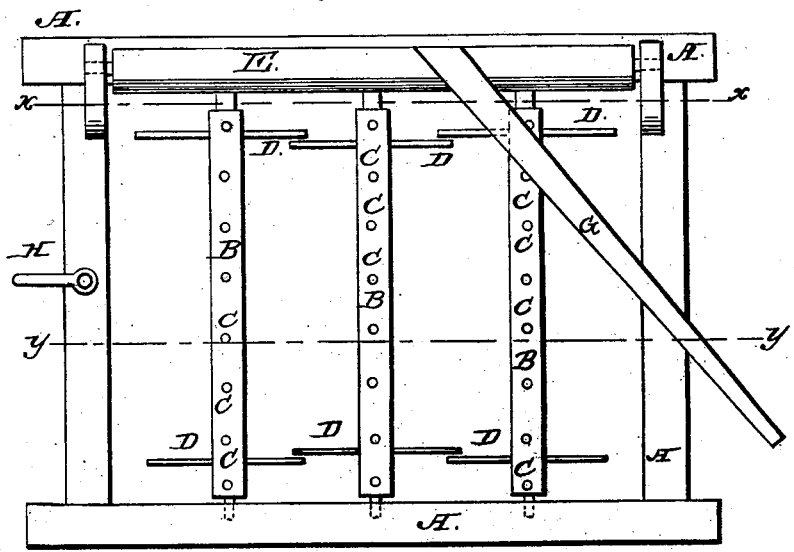
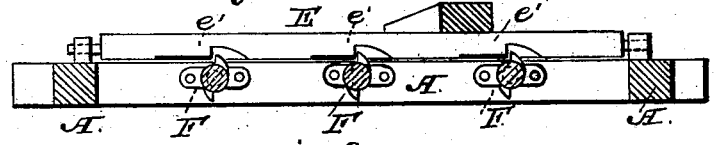
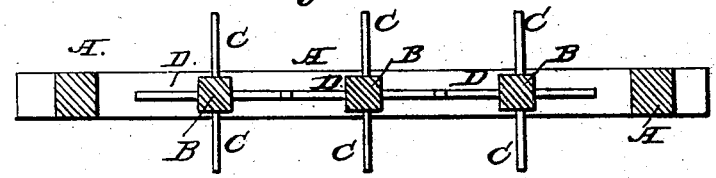
Witnesses:
A. W. Almquist
Wm. A. Magan
Inventor
Moses Atwood
per Munn & Co.
Attorneys

MOSES ATWOOD, OF NEW SHARON, IOWA.

Letters Patent No. 84,339, dated November 24, 1868.

IMPROVEMENT IN HARROWS.

The Schedule referred to in these Letters Patent and making part of the same.

*To all whom it may concern:*

Be it known that I, MOSES ATWOOD, of New Sharon, in the county of Mahaska, and State of Iowa, have invented a new and useful Improvement in Harrows; and I do hereby declare that the following is a full, clear, and exact description thereof, which will enable others skilled in the art to make and use the same, reference being had to the accompanying drawings, forming part of this specification, in which—

Figure 1 is a top or plan view of my improved harrow.

Figure 2 is a detail longitudinal section of the same, taken through the line $x\ x$, fig. 1.

Figure 3 is a detail longitudinal section of the same, taken through the line $y\ y$, fig. 1.

Similar letters of reference indicate like parts.

My invention has for its object to furnish an improved harrow, which shall be so constructed that, should the teeth become clogged or strike an obstruction, it may be easily and quickly cleared, without its being necessary to raise the harrow-frame from the ground; and It consists in the construction and combination of various parts of the harrow, as hereinafter more fully described.

A is the harrow-frame, which is rectangular in form, and consists of two side-bars and two end-bars, securely framed together at their ends, and which may be of any desired size.

B are shafts, any desired number of which may be used, and the ends of which are pivoted to the side-bars of the frame A, so that the said shafts may revolve freely.

C are the teeth of the harrow, which are made long, and which project equally upon both sides of said shafts B.

D are teeth or arms, passing through the shafts B, near their ends, at right angles to the teeth C, as shown in figs. 1 and 3.

E is a bar, which is pivoted or hinged to the frame A, so as to extend along the side-bar of said frame, and overlapping the inner edge of said side-bar.

Upon the under side of the bar E are formed notches or catches $e'$, in such positions that the shoulders of the cams F, formed upon or attached to the journals of the shafts B, may strike against the shoulders of the said notches $e'$, and hold the shafts securely when the teeth C are in working position, as shown in fig. 2.

G is a lever, attached to the bar E, and the free end of which extends back into such a position that it may be conveniently reached and operated by the driver walking in the rear of the harrow.

By this construction, should the teeth C become clogged or strike an obstruction, by raising the free end of the lever G the bar E will be lifted away from the cams F, allowing the resistance of the ground to revolve the shafts B, and thus clear the said teeth.

As the lower ends of the teeth C move back, the ends of the teeth or arms D come in contact with the ground, and revolve the said shafts B still further, so that the other ends of the teeth C will come into working position, and so as to bring the other cams F in contact with the catches $e'$, again holding the said shafts steady, with the teeth C, in working position.

H is the draught-clevis, which may be attached to the front bar of the frame A or to the corner of said frame, as may be desired.

Having thus described my invention,

I claim as new, and desire to secure by Letters Patent—

1. The pivoted or hinged bar E, having notches or catches $e'$ formed upon its lower side, and the cams F, in combination with each other and with the frame A and toothed shafts B, substantially as herein shown and described, and for the purpose set forth.

2. The combination of the arms or teeth D with the shafts B and teeth C, substantially as herein shown and described, and for the purpose set forth.

3. An improved harrow, formed by the combination of the frame A, shafts B, teeth C, arms or teeth D, pivoted or hinged bar E, having notches or catches $e'$ upon its lower side, cams F, and lever G, with each other, substantially as herein shown and described, and for the purpose set forth.

MOSES ATWOOD.

Witnesses:
F. M. ALLEN,
A. E. BRUCE.